Patented Apr. 1, 1924.

1,488,815

UNITED STATES PATENT OFFICE.

ISAAC F. HARRIS, OF TUCKAHOE, NEW YORK.

VITAMIN BODY AND METHOD OF PREPARING THE SAME.

No Drawing.    Application filed December 26, 1919. Serial No. 347,503.

*To all whom it may concern:*

Be it known that I, ISAAC F. HARRIS, a citizen of the United States, and a resident of Tuckahoe, Westchester County, State of New York, have invented an Improvement in Vitamin Bodies and Methods of Preparing the Same, of which the following is a specification.

My invention relates to "vitamin" bodies and methods of preparing the same, more particularly from such substances as yeast, for example from the living cells of yeast of the variety of "Saccharomyces cerevisiæ."

It is an object of the present invention to obtain such "vitamin" bodies in a highly concentrated, stable form, substantially free from deleterious substances and diluents, and also to devise a simple, economical, and expeditious method of obtaining such "vitamin" bodies in such desirable form.

By way of example, I shall describe in the accompanying specification illustrative embodiments of the method and of the product of my invention, it being understood that said embodiments are herein set forth in detail merely for purposes of example and illustration, and that the invention is not limited to such illustrative embodiments.

As my starting material I prefer to use yeast, more particularly living yeast cells, of the variety "Saccharomyces cerevisiæ," obtained, for example, from the fermentation of beer. I find that by using this material I am enabled to obtain "vitamin" bodies in highly concentrated and stable forms, substantially free from deleterious by-products and diluents.

I first wash the living yeast cells with water to remove the beer or other fluid in which the yeast was grown. This may readily be done without removing any of the soluble "vitamin" bodies, since the living yeast cells are so combined with one another that the cells may be washed with water without losing any of their internal soluble constituents.

I then plunge the living yeast cells into boiling, acidified water. This results in immediately killing the yeast cells without permitting the formation of certain harmful by-products which would be formed if the cells were permitted to degenerate and die by themselves. The result of thus immediately killing the yeast is to prevent those changes from taking place which would otherwise occur in dead yeast cells which have not been exposed to a high temperature.

If the cells are not instantly killed, autolysis occurs, with the result that the enzymes or ferments present in the cells convert the protein constituents of the cells into undesirable, water-soluble substances which cannot be coagulated by heat. If, however, the cells are instantly killed by boiling water, especially water which has been acidified with from about three-quarters to about one and one-half per cent, preferably about one per cent, of acetic acid, such undesirable changes do not occur in the proteins, and consequently the proteins may be coagulated and rendered insoluble. They may then be readily separated from the soluble and uncontaminated "vitamin" bodies.

After the yeast has been boiled as above set forth, the insoluble substances remaining undissolved in the acidified water and including the coagulated albumins, are removed by filtration. The filtrate is then reduced to dryness in a vacuum and at a low temperature, to thereby minimize decomposition of the dissolved "vitamin" bodies. By thus evaporating the solution, which contains substantially all of the "vitamin" bodies dissolved, there is obtained a gummy, semi-solid mass.

This gummy, semi-solid mass, which has been derived as above set forth, is now extracted with a solvent capable of selectively dissolving the "vitamin" constituents of the mass referred to. Preferably I employ an aqueous solution of ethyl alcohol, containing from about fifty to about sixty per cent, preferably about fifty-two per cent, of ethyl alcohol. This solution readily dissolves out substantially all of the "vitamin" bodies present in the gummy mass.

The whole is then filtered, and the filtrate will be found to contain substantially all of the original "vitamin" content of the yeast cells. The filtrate is now reduced to dryness at a low temperature and under a vacuum to minimize decomposition and the formation of undesirable by-products. This product is further extracted with eighty to ninety per cent ethyl alcohol, and filtered. The precipitate which is insoluble in eighty to ninety per cent alcohol is now dehydrated in any suitable manner, preferably by such dehydrating chemicals as anhydrous ethyl alcohol, anhydrous acetone and anhydrous ether. These dehydrating agents, if used, are removed preferably at a low temperature, in a vacuum, whereby a brownish to light yellow mass remains, which can be quickly reduced to a dry powder, under suitable precautions against atmospheric moisture. The product thus derived may be used in the form in which it is thus obtained and will be found to be a highly concentrated "vitamin" substance, possessing a high degree of "vitamin" activity, and comprising a light yellowish-brown powder, which is very hygroscopic and has an odor and taste similar to the extract of beef.

This powder is readily soluble in cold water, producing a perfectly clear solution, and is still more readily soluble in hot water. The substance is freely soluble in ethyl alcohol of a strength of about 52%, but is less soluble in ethyl alcohol stronger than eighty per cent, and is substantially insoluble in absolute alcohol. The aqueous solutions of this substance are light to dark brown in color, according to increasing concentration of the solution in dissolved "vitamin" substance. Such aqueous solutions possess a taste similar to the taste of extract of beef, and have other properties analogous to those possessed by a mixture of peptones, propeptones and amino-acids.

The "vitamin" body described above is substantially free from coagulable proteins, and gives reactions indicating the presence of amino groups, but does not however give the "biuret" reaction. Solutions of such "vitamin" bodies give copious precipitates with phospho-tungstic acid, which, however, does not precipitate everything from the solution. Aqueous solutions of such "vitamin" bodies are also partly precipitated by solutions of barium hydroxide, silver nitrate, mercuric chloride and lead acetate. The dry powder, when burned, leaves about twelve to fifteen per cent by weight of ash.

The high degree of "vitamin" activity of the foregoing "vitamin" substance can readily be demonstrated by feeding it to caged animals which were previously fed for several days upon a diet containing an insufficient quantity of water-soluble "vitamins", namely, a diet made up of such substances as cane sugar, starch, casein, lard, and a suitable mixture of mineral salts. The recovery of such animals is remarkably rapid, and indicates that the "vitamin" substance described above is of very great concentration.

What I claim is:

1. A method of deriving a "vitamin" body from living yeast cells which comprises the step of quickly killing the yeast cells by boiling the same in water acidified with from about three-quarters to about one and one-half per cent of acetic acid.

2. A method of deriving a "vitamin" body from yeast cells which comprises boiling said cells with water acidified with about one per cent of acetic acid, filtering, drying the filtrate in vacuo and at a low temperature, thereafter extracting the dried product with an aqueous solution of ethyl alcohol of about fifty-two per cent strength, filtering, and thereafter reducing the filtrate to dryness.

3. A method of deriving a "vitamin" body from yeast which comprises the steps of treating the dried mass resulting from evaporating an aqueous, substantially protein-free solution of said "vitamin" body with a solvent containing ethyl alcohol, filtering the resulting solution, and thereafter reducing the same to dryness under a vacuum and at a low temperature, further treating the dried mass with ethyl alcohol and drying the precipitate obtained thereby, to thereby minimize the decomposition of the "vitamin" body.

4. A method of deriving a "vitamin" body from yeast which comprises the steps of treating the dried mass resulting from evaporating an aqueous, substantially protein-free solution of said "vitamin" body with ethyl alcohol of a concentration of from fifty-two per cent to sixty per cent, filtering said solution, reducing the filtrate obtained thereby to dryness, treating said dried mass with ethyl alcohol of a concentration of from eighty to ninety per cent, filtering said solution and reducing the precipitate thereby obtained to dryness.

5. A method of deriving a concentrated, water-soluble "vitamin" body from yeast which comprises the steps of evaporating an aqueous, substantially protein-free solution of a water-soluble "vitamin" body to obtain a dried mass therefrom, treating the resulting dried mass with a solvent capable of selectively dissolving said "vitamin" body, filtering the resulting solution, and thereafter reducing the same to dryness under a vacuum and at a low temperature, to thereby minimize the decomposition of the "vitamin" body.

6. A method of deriving a "vitamin" body from yeast which comprises the steps of treating the dried mass resulting from evaporating an aqueous, substantially protein-free solution of said "vitamin" body with a solvent containing ethyl alcohol, filtering the resulting solution, and thereafter reducing the same to dryness under a vacuum and at a low temperature, to thereby minimize the decomposition of the "vitamin" body.

7. A method of deriving a "vitamin" body from yeast which comprises the steps of treating the dried mass resulting from evaporating an aqueous, substantially protein-free solution of said "vitamin" body with an aqueous solution of ethyl alcohol of from about fifty to about sixty per cent strength, filtering the resulting solution and thereafter reducing the same to dryness under a vacuum and at a low temperature, to thereby minimize the decomposition of the "vitamin" body.

In testimony whereof, I have signed my name to this specification this 24th day of December, 1919.

ISAAC F. HARRIS.